United States Patent [19]

Leyerle

[11] Patent Number: 4,499,201

[45] Date of Patent: Feb. 12, 1985

[54] PROCESS FOR REMOVING ALUMINA OR SILICA SUBSTRATE FROM CARBONACEOUS PYROPOLYMERS

[75] Inventor: Richard W. Leyerle, Arlington Heights, Ill.

[73] Assignee: UOP Inc., Des Plaines, Ill.

[21] Appl. No.: 496,147

[22] Filed: May 19, 1983

[51] Int. Cl.³ ............................................. B01J 21/18
[52] U.S. Cl. ................................... 502/180; 423/135; 423/343; 502/182; 502/416
[58] Field of Search ............... 423/135, 343; 502/180, 502/182, 416

[56] References Cited

U.S. PATENT DOCUMENTS

| | | | |
|---|---|---|---|
| 4,090,978 | 5/1978 | Welsh et al. | 252/425 |
| 4,292,282 | 9/1981 | Welsh et al. | 423/135 |
| 4,329,260 | 5/1982 | Lester et al. | 252/446 |

*Primary Examiner*—Herbert T. Carter
*Attorney, Agent, or Firm*—James R. Hoatson, Jr.; Raymond H. Nelson; William H. Page, II

[57] ABSTRACT

Carbonaceous pyropolymers possessing recurring units containing at least carbon and hydrogen atoms may be obtained from compositions of matter comprising carbonaceous pyropolymers possessing recurring units containing at least carbon and hydrogen atoms composited on an inorganic metal oxide support or substrate by treating the composition of matter with a chloride-containing compound at an elevated temperature in the range of from about 400° to about 1000° C. in the vapor phase. The resulting metal chloride such as aluminum chloride is continuously removed from the composite, leaving only the carbonaceous pyropolymer.

8 Claims, No Drawings

PROCESS FOR REMOVING ALUMINA OR SILICA SUBSTRATE FROM CARBONACEOUS PYROPOLYMERS

BACKGROUND OF THE INVENTION

Carbonaceous pyropolymers possessing recurring units containing at least carbon and hydrogen atoms per se will find a wide variety of uses in the chemical and electrical field. For example, the composites in the form of powders may be used as electrocatalysts which are used in the preparation of an electrode for an electrochemical cell. Other composites which are in the form of shaped replications of particle aggregates in the form of rods, pellets, spheres, etc. may be used as supports for chemically active metals or as adsorbents which may be utilized in a fixed bed adsorption process. The shaped replications of particle aggregates which will have impregnated on the surface thereof a chemically active metal are useful in a wide variety of chemical reactions such as polymerization reactions, reforming reactions, hydrocracking reactions, as a catalyst support for ammonia synthesis, as a support for metal phthalocyanine complexes which will form a catalyst useful for sweetening of petroleum products such as gasoline, etc. The shaped replications will themselves possess the desired characteristics of surface area, pore volume, apparent bulk density, crushing strength, etc. which will enable their use as supports or in fixed bed adsorption processes without undergoing physical deterioration to form powders, dust, fines, etc. and thus limit the use of such a composite.

The carbonaceous pyropolymers possessing recurring units containing at least carbon and hydrogen atoms which are composited on an inorganic metal oxide support, may be prepared by any known method such as by contacting the inorganic support or substrate at an elevated temperature of from about 400° to about 1200° C. in a reducing atmosphere containing an organic pyropolymer precursor to form a carbonaceous pyropolymer possessing recurring units containing at least carbon and hydrogen atoms on the inorganic metal oxide support. The organic pyropolymer precursors which may be used would include members of the group consisting of aliphatic hydrocarbons, aliphatic halogen derivatives, aliphatic oxygen derivatives, aliphatic sulfur derivatives, aliphatic nitrogen derivatives, alicyclic compounds, aromatic compounds, and heterocyclic compounds. Of the aromatic hydrocarbons, the most common class which may be utilized to form this polymeric process includes alkanes, alkenes, alkadienes, alkynes, etc. Aliphatic oxygen derivatives may include alcohols, ethers, aldehydes, ketones, etc; aliphatic sulfur derivatives may include mercaptans, sulfides, etc; aromatic compounds may include benzene, naphthalene, etc. As can be seen, an extremely wide latitude can be exercised in the selection of the organic pyrolyzable compounds inasmuch as virtually any organic material that can be vaporized, decomposed and polymerized on the refractory oxide by heating will suffice. The resultant carbonaceous pyropolymer will possess recurring units containing at least carbon and hydrogen atoms; however, depending upon the pyropolymer precursor which has been selected, the pyropolymer may also contain other atoms such as nitrogen, oxygen, sulfur or, if a metal containing organic compounds has been employed, a metal such as tin.

In another embodiment, the composite may be prepared by impregnating the refractory inorganic oxide substrate with a solution of a carbohydrate material such as dextrose, sucrose, fructose, starch, etc. and thereafter drying the impregnated support. After drying, the impregnated substrate or support is then subjected to pyrolysis temperatures in the range hereinbefore set forth whereby a carbonaceous pyropolymer similar in nature to those hereinbefore described is formed on the surface of the refractory inorganic oxide support.

Heretofore, in order to obtain a carbonaceous pyropolymer possessing recurring units containing at least carbon and hydrogen atoms alone, the inorganic support was chemically leached from the carbonaceous pyropolymer. The leaching was effected by treating the composite with either an acid or a base, thereby forming a high surface area carbonaceous pyropolymer support in the form of a powder or a shaped replication of the original inorganic support. The leaching of the base material of the type hereinbefore set forth may be effected over a wide range of temperatures, said range being from about ambient (20°–25° C.) up to about 250° C. or more for a period of time which may range from less than 1 up to about 72 hours or more. It is to be understood that the operating parameters of the leaching step will vary over a wide range and will be dependent upon a combination of time, temperature, strength of the leaching solution, etc. Examples of acids or bases which may be utilized to leach out the base material, that is, the inorganic support such as a refractory inorganic oxide, will include inorganic acids such as phosphoric acid, sulfuric acid, nitric acid, hydrochloric acid, etc. organic acids such as methyl sulfonic acid, ethyl sulfonic acid, propyl sulfonic acid, toluene sulfonic acid, etc., strong bases such as sodium hydroxide, potassium hydroxide, lithium hydroxide, rubidium hydroxide, cesium hydroxide, etc. It is to be further understood that the aforementioned leaching materials are only representative of the class of compounds which may be used and that any chemical which is capable of removing the refractory inorganic oxide while retaining the high surface area of the carbonaceous pyropolymer may be used.

The methods of obtaining the carbonaceous pyropolymer possessing recurring units containing at least carbon and hydrogen atoms has been set forth in U.S. Pat. Nos. 4,090,978 and 4,329,260.

A disadvantage or drawback when employing this type of process for leaching out the refractory oxide substrate is that a large amount of waste material is formed by the leaching operation. Therefore, after dissolution of the refractory inorganic oxide substrate, further steps are required which include extensive filtering and washing of the remaining carbonaceous pyropolymer to remove the metal ions such as aluminum or silicon and the leaching material such as, for example, phosphoric acid from the carbonaceous pyropolymer. The resulting solutions are not easily regenerated or dissolved, the presence of these materials thus posing a problem which requires further equipment with an attendant added capitalization factor of the money required to prepare the desired material.

As will hereinafter be shown in greater detail, an alternate method for removing the substrate may be effected without requiring additional steps in the disposal of waste material.

SUMMARY OF THE INVENTION

This invention relates to a method for the removal of substrate of support material from a composition of matter which comprises a carbonaceous pyropolymer possessing recurring units containing at least carbon and hydrogen atoms deposited on the surface of an inorganic refractory oxide support or substrate. More particularly, the invention is concerned with a process for treating such a composition of matter with a chloride-containing compound to remove the substrate material from the composition.

As was hereinbefore discussed, carbonaceous pyropolymers possessing recurring units containing at least carbon and hydrogen atoms may be used in many forms in the chemical and electrical industry, particularly the former. The carbonaceous pyropolymers in the form of shaped replications of particle aggregates will be used for catalyst supports or per se as adsorbents in chemical separations, while in the powdered form they may be used as electrodes in electrochemical cells. The use of these materials in chemical reactions is enhanced as the carbonaceous pyropolymer possessing recurring units containing at least carbon and hydrogen atoms may be prepared in an economical manner, thus reducing the overall cost of the chemical reaction and making the reactions economically attractive to operate.

It is therefore an object of this invention to provide a process for preparing carbonaceous pyropolymers possessing recurring units containing at least carbon and hydrogen atoms.

A further object of this invention is to provide an economical process for the removal of substrate or support material from carbonaceous pyropolymers possessing recurring units containing at least carbon and hydrogen atoms whereby subsequent steps of material removal may be eliminated.

In one aspect, an embodiment of this invention resides in a process for the removal of an inorganic metal oxide substrate from a composition of matter which comprises a carbonaceous pyropolymer possessing recurring units containing at least carbon and hydrogen atoms composited on an inorganic metal substrate which comprises subjecting said composition of matter to the action of a chloride-containing compound at an elevated temperature in the vapor phase to form a volatile metal chloride, and recovering the remaining carbonaceous pyropolymer possessing recurring units containing at least carbon and hydrogen atoms.

A specific embodiment of this invention is found in a process for the removal of an aluminum oxide substrate from a composition of matter which comprises a carbonaceous pyropolymer possessing recurring units containing at least carbon and hydrogen atoms composited on an alumina substrate which comprises subjecting said composition of matter to the action of 1,1,2,2-tetrachloroethylene at a temperature in the range of from about 400° to about 1000° C. in the vapor phase to form aluminum chloride and carbon monoxide, and recovering the remaining carbonaceous pyropolymers possessing recurring units containing at least carbon and hydrogen atoms.

Other objects and embodiments will be found in the following further detailed description of the present invention.

DETAILED DESCRIPTION OF THE INVENTION

As hereinbefore set forth, the present invention is concerned with a process for the removal of substrate or support material from a composition of matter which comprises a carbonaceous pyropolymer possessing recurring units containing at least carbon and hydrogen atoms composited on an inorganic refractory metal oxide material. The composition of matter which is to undergo removal of the refractory oxide may be prepared in any manner, one such method of preparing the material being to place the refractory inorganic metal oxide which, in the preferred embodiment of the invention, comprises a high surface area material such as alumina and particularly gamma-alumina, silica, silica-alumina, etc. in a reaction vessel. The temperature of the reaction vessel is then raised to at least 500° C. and preferably in a range of from about 600° to about 1000° C. The refractory oxide is then subjected to the action of a pyrolyzable organic compound of the type hereinbefore set forth, preferably in an inert atmosphere provided for by the presence of an inert gas such as nitrogen, helium, argon, etc. and the pyrolyzable substance such as benzene, cyclohexene, etc. is passed through the reaction vessel at a predetermined rate. After maintaining the flow rate for a period of time which may range from about 1 to about 20 hours or more in duration, the resulting composite comprising a carbonaceous pyropolymer possessing recurring units containing at least carbon and hydrogen atoms composited on the inorganic refractory metal oxide support is withdrawn and cooled. Alternatively, the refractory metal oxide support may be impregnated with an aqueous solution of dextrose at ambient temperature for a period of time sufficient to impregnate the metal oxide. Following the impregnation, the impregnated support material is dried and pyrolyzed at a temperature in the range of from about 600° to about 1000° C. for a period of about 1.5 hours, following which the desired composite is recovered.

The composition of matter comprising the carbonaceous pyropolymer possessing recurring units containing at least carbon and hydrogen atoms composited on the refractory inorganic metal oxide support or substrate is then processed in the same reactor or, if so desired, it may be placed in a separate reaction vessel and exposed to treatment by an organic chloride-containing compound. The treatment may, if so desired, be also effected in the presence of an inert carrier gas such as nitrogen at elevated temperatures in the range of from about 400° to about 1000° C., said treatment being effected in the vapor phase. By utilizing an organic chloride-containing compound, it is possible to remove the substrate material in the form of a metal chloride such as aluminum chloride, silicon chloride, etc. without affecting the carbon which is present in the carbonaceous pyropolymer, the carbon in the organic chloride-containing compound acting as an acceptor for the oxygen present in the inorganic metal oxide substrate. The metal chloride which is in the vapor phase at this temperature may be continuously withdrawn from the reaction vessel and condensed. After condensation of the metal chloride such as aluminum chloride, it could, if so desired, be cycled to a sol such as an alumina sol, silica sol, etc. and utilized therein in the preparation of further substrate materials.

Examples of organic chloride-containing compounds which may be employed to effect the removal of the substrate or support material from the composition of matter will include chloroform, carbon tetrachloride, 1,1,2-trichloroethylene, 1,1,2,2-trichloroethylene, 1,1,3-trichloropropylene, 1,1,3,3-tetrachloropropylene, phosgene, etc. It is to be understood that the aforementioned organic chloride-containing compounds are only representative of the class of compounds which may be employed, and that the present invention is not necessarily limited thereto. It is also contemplated within the scope of this invention that other chloride-containing compounds may also be employed to remove the inorganic refractory oxide material. As an example of this, boron trichloride may be used at an elevated temperature to form, when alumina is used as the substrate material, aluminum chloride and boron oxide. The boron oxide which is formed may be washed from the carbonaceous pyropolymer possessing recurring units containing at least carbon and hydrogen atoms, with hot water to permit recovery of the desired carbonaceous pyropolymer. In any event, there will be no consumption of carbon, thus permitting the desired carbonaceous pyropolymer to remain intact.

After treatment of the composition of matter for a period of time sufficient to convert the refractory oxide material such as alumina or silica to the corresponding aluminum chloride or silicon chloride, heating and charging of the organic compound are discontinued and the desired product comprising a carbonaceous pyropolymer possessing recurring units containing at least carbon and hydrogen atoms in the desired form such as powder, pellets, spheres, rods, etc. is removed from the reaction vessel and recovered.

The treatment of the composition of matter which comprises the carbonaceous pyropolymer composited on a solid substrate may be effected by utilizing various types of apparatus, namely, a flow-through apparatus which will permit a constant removal of the volatile products. One example of a type of apparatus which may be employed comprises a tube furnace in which the composition of matter is placed in a tube which may be of any suitable material such as glass, quartz or a metal which will possess the ability to withstand the relatively high temperatures required for the process. After placing the composition of matter in the apparatus, the apparatus is heated to the desired operating temperature which, as hereinbefore set forth, may be in the range of from about 400° to about 1000° C. The chloride-containing compound along with, if so desired, an inert carrier gas is passed over the composition of matter at a predetermined flow rate. The resulting metal chloride such as aluminum chloride, which is in a vapor state at the temperature so utilized, along with carbon monoxide or carbon dioxide, which is formed by the reaction, is continuously removed, the metal chloride being thereafter condensed and, if so desired, recycled to a sol for use in the preparation of other materials.

The following examples are given to illustrate the process of the present invention, however, it is to be understood that these examples are given merely for illustrative purposes and that the present invention is not necessarily limited thereto.

EXAMPLE I

A composition of matter comprising a carbonaceous pyropolymer possessing recurring units containing at least carbon and hydrogen atoms composited on a refractory inorganic metal oxide support may be prepared by placing gamma-alumina spheres in a quartz vessel. The spheres may be held in the vessel in a bed which may extend across the vessel between two screens. A gas furnace may be positioned around the quartz vessel so as to heat the spheres and the incoming feed stream, said gas furnace being positioned to form a jacket around the vessel. If so desired, quartz chips may be positioned in the vessel atop the upper screen, said quartz chips acting as a feed preheater. The vessel and alumina spheres may be heated to a temperature of about 600° C. under an atmosphere of nitrogen. A carrier gas comprising a mixture of nitrogen and cyclohexane may be passed through the reactor at a rate in the range of from about 0.2 to about 1 cc of cyclohexane per cc of alumina. After a period of about 20 hours has elapsed, the resulting composition of matter may be removed from the reactor vessel and cooled.

The composition of matter comprising a carbonaceous pyropolymer possessing recurring units containing at least carbon and hydrogen atoms composited on the alumina may then be placed in a tube furnace which may be heated to a temperature of about 700° C. A chloride-containing compound comprising 1,1,2,2-tetrachloroethylene admixed with nitrogen which acts as an inert carrier gas may then be passed over the composition of matter at a rate sufficient to enable thorough contact of the tetrachloroethylene with the composition of matter. The flow of the tetrachloroethylene in nitrogen may be effected for a period of time sufficient to transform the alumina in the substrate to aluminum chloride, said aluminum chloride and manufactured carbon monoxide being continuously withdrawn from the tube furnace. At the end of the treatment period, charging of the feed gas to the tube furnace may be discontinued and the desired compound comprising a carbonaceous pyropolymer possessing recurring units containing at least carbon and hydrogen atoms from which the substrate has been removed may be recovered.

EXAMPLE II

A substrate material comprising gamma-alumina in the form of spheres may be positioned in a metal reactor similar to that described in Example I above. After heating of the gamma-alumina in a nitrogen atmosphere at a temperature of 800° C., a feedstock comprising benzene in an inert carrier gas comprising nitrogen may be passed through the reactor while maintaining the temperature of the reactor at about 800° C. for a period of 2 hours. Upon completion of this period, charging of benzene and nitrogen is discontinued and the resulting composition of matter comprising a carbonaceous pyropolymer possessing recurring units containing at least carbon and hydrogen atoms composited on a gamma-alumina may then be treated to remove the alumina.

The composition of matter may be treated in the same reactor by substituting a feed of carbon tetrachloride and nitrogen and passing the feed over the composition of matter while maintaining the temperature of the reactor at about 800° C. The feed of carbon tetrachloride is discontinued and the desired compound comprising a carbonaceous pyropolymer possessing recurring units containing at least carbon and hydrogen atoms may be recovered.

EXAMPLE III

A base or support material comprising silica spheres may be placed in a reactor similar to that hereinbefore described which is thereafter heated to a temperature of about 600° C. The refractory inorganic metal oxide may be treated at a temperature of about 600° C. with an organic compound comprising n-pentane in a nitrogen atmosphere. After a period of about 6 hours has elapsed, the pentane flow and heating may be discontinued and, after cooling, the carbonaceous pyropolymer possessing recurring units containing at least carbon and hydrogen atoms composited on silica may be recovered.

The composition of matter may then be placed in a tube furnace which may then be heated to a temperature of about 800° C. and a feed comprising a mixture of phosgene in an inert carrier gas of nitrogen may be passed over the composite. The silica substrate material may be converted by the action of this gas to a mixture of silicon chloride along with carbon dioxide and may be continuously removed from the tube furnace.

EXAMPLE IV

In a similar manner, alumina spheres may be placed in a reactor and heated to a temperature of about 800° C. Following this, toluene in a nitrogen atmosphere may be passed over the alumina for a period of about 2 hours while maintaining the reactor temperature at about 800° C. At the end of this time period, heating may be discontinued as may the flow of toluene and the resulting composition of matter comprising a carbonaceous pyropolymer possessing recurring units containing at least carbon and hydrogen atoms composited on the alumina may be recovered.

The composition of matter which may be prepared according to the above paragraph may be placed in an appropriate apparatus such as a tube furnace which may be heated to a temperature of about 750° C. The composition of matter may then be treated by passing a stream of boron trichloride in a nitrogen atmosphere through the tube furnace and continuously removing the aluminum chloride formed during the treatment period. At the end of a predetermined period of time, the flow of boron trichloride may be discontinued and, after cooling, the resultant carbonaceous pyropolymer possessing recurring units containing at least carbon and hydrogen atoms mixed with boron oxide may be recovered. This material may then be washed with hot water to hydrolyze and dissolve the boron oxides. The material then may be dried and the resultant carbonaceous pyropolymer possessing recurring units containing at least carbon and hydrogen atoms may be recovered.

I claim as my invention:

1. A process for the removal of alumina or silica from a composition of matter comprising a carbonaceous pyropolymer possessing recurring units containing at least carbon and hydrogen atoms composited on an alumina or silica substrate, which process comprises contacting said composition of matter at a temperature of from about 400° C. to about 1000° C. with the vapors of an organic chloride-containing compound reactable with the alumina or silica content of the substrate to form aluminum chloride or silicon chloride, removing the resultant aluminum or silicon chloride vapor, and recovering the remaining carbonaceous pyropolymer possessing recurring units containing at least carbon and hydrogen atoms.

2. The process as set forth in claim 1 in which said substrate comprises a high surface area alumina.

3. The process as set forth in claim 2 in which said high surface area alumina is gamma-alumina.

4. The process as set forth in claim 1 in which said substrate comprises silica.

5. The process as set forth in claim 1 in which said organic chloride-containing compound comprises 1,1,2,2-tetrachloroethylene.

6. The process as set forth in claim 1 in which said organic chloride-containing compound comprises carbon tetrachloride.

7. The process as set forth in claim 1 in which said organic chloride-containing compound comprises phosgene.

8. The process as set forth in claim 1 in which said organic chloride-containing compound comprises chloroform.

* * * * *